Nov. 28, 1961  C. G. MANNING  3,010,399
IMPULSE GENERATOR
Filed July 2, 1957
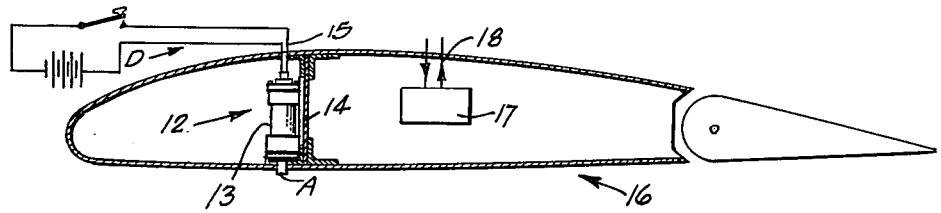
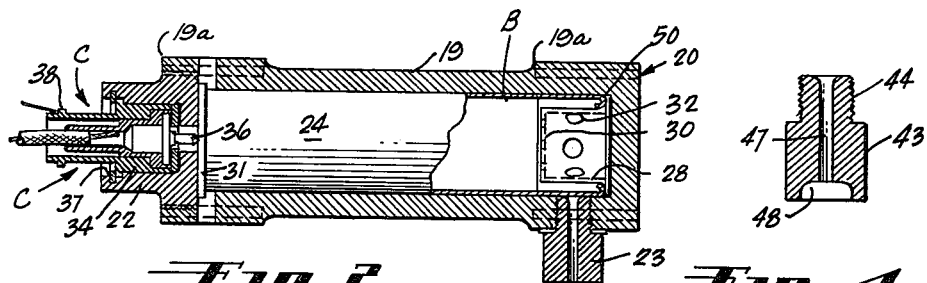
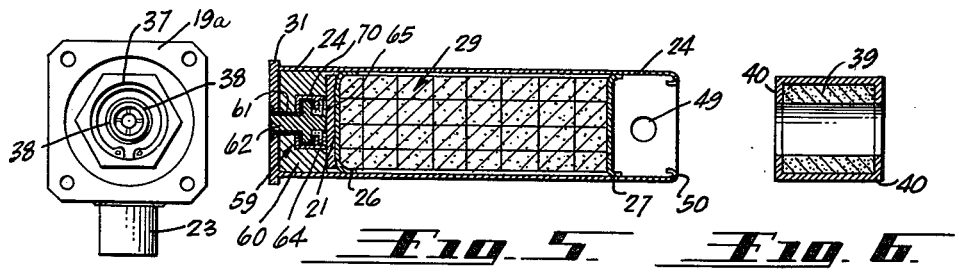
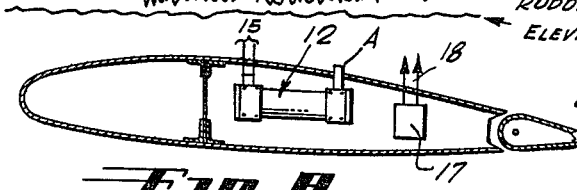
INVENTOR.
CHARLES G. MANNING
BY
ATTORNEY.

United States Patent Office 3,010,399
Patented Nov. 28, 1961

3,010,399
IMPULSE GENERATOR
Charles G. Manning, Los Angeles, Calif., assignor to Douglas Aircraft Company, Inc., Santa Monica, Calif.
Filed July 2, 1957, Ser. No. 669,556
4 Claims. (Cl. 102—98)

This invention relates to the testing of aircraft flight surfaces, particularly stabilizing surfaces, to determine the inherent vibration-damping characteristics thereof.

If an airfoil possesses positive or neutral damping characteristics against vibrations thereof, it is not likely to flutter dangerously. But if the airfoil possesses negative damping characteristics it will undergo flutter, and all flutter increases in amplitude until the flight-surface disintegrates. Sometimes resonance phenomena couple the flutter of the flight surface with the rest of the airplane and cause the latter to flutter and disintegrate.

Although it is possible to excite vibration by discharging a bomb from a bomb-rack, by kicking the rudder, or by jerking the control stick, it is now the general practice to employ an impulse generator or generators fixed to the flight surface under test and electrically fired by the pilot to excite a series of vibrations in the concerned airfoil.

One of the current modes of flight testing an airfoil by means of impulse generators consists in flying at an initial one of a series of successively higher speeds, firing an impulse generator attached to the airfoil, telemetering the wave trains to the oscillograph of a ground monitoring station, increasing the airspeed to the next higher successive selected speed, firing another impulse generator attached to the airfoil, telemetering its wavetrain, and so on.

The results to be expected from firing any one generator, after the first one, may be "pre-viewed" at the monitoring station by plotting the airspeed vs. damping obtained from the preceding "shot" and extrapolating the curve onwardly through this point.

On some occasions, the "N$th$" shot may be expected to lie below the zero damping line. This situation constitutes "negative damping," or "flutter" and if such occurred in a main flight surface, it might well be catastrophic. Therefore, before the airplane is put into this extrapolated speed, it may be necessary to suitably modify the structure, etc., of the airfoil to obviate negative damping.

Generally speaking, impulse generators for this purpose are, at present, somewhat analogous to a shotgun shell attached to the airfoil and fired by the pilot. Current generators fall somewhat short of requirements for several reasons, among which may be mentioned the fact that, in order to obtain a significant excitation of the airfoil, contemporary generators need to be so bulky, and consequently cumbrous and heavy, as to significantly modify the natural frequency of vibration of most airfoils. Further, the pattern of the natural frequency of vibration of most airfoils follows a sine curve's conformation, so that the generator must add to the wave-train one-half a sine curve, for compatibility and augmentation. However, to the best of my knowledge, all impulse generators previous to present one have, with one shot, excited a plurality of modes of vibration from which it is difficult to extricate any one mode. Nor have they been able to introduce a mode approaching anything like a sine curve into this plurality of modes.

Subject invention provides means and methods that ameliorate this situation at least to the extent of providing a combustion-reaction type of generator of unique configuration, which is readily fired electrically by the pilot and has no significant effect upon the natural frequency, or other relevant characteristics, of the tested airfoil. It is compact and relatively light and can be as readily mounted to the airfoil and as facilely removed. Having a novel axial expansion type nozzle, many advantages ensue, among which may be mentioned the fact that such enables the optimum nozzle area to be determined accurately and readily by means of the laws of internal ballistics, giving a general solution to the design problem. By means of a novel pelleting of the combustible charge of the generator, including a hollow pellet of modified smokeless powder, or the like, coated on all surfaces except the wall of the hollow with a "flame-inhibitor," each pellet is given a potential thermal energy which converts heat energy into work which, by means of the novel generator, is fully employable as thrust for excitation of the airfoil. Despite the "miniature" size of the generator, this and other factors enable it to excite the airfoil to a degree, and for a sufficient number of cycles, to enable accurate determination, at the monitoring station, of the damping characteristics of the airfoil. Because of the cooperation of the novel nozzle and the novel propellant, the invention produces a temperature differential between the extremely high temperature of the propellant igniter and the nozzle temperature, thereby conferring a substantively high thermal efficiency upon the generator, regardless of its compactness and small size. This feature is aided by the fact that the novel coating is of such a composition as to have a high density but a low specific heat.

The inhibitor coating is of such a composition and can be so applied that its thicknes and geometry can readily be varied to suit varying needs. In any case, it is also of such a nature and configuration as to prevent both the igniter flame "punching" through it and preventing the surrounding pellet flames from causing too rapid burning on any surface except that of the central "hollow" of the pellet. The coating, being preferably composed essentially of a phenol formaldehyde spar type varnish suitably admixed with a silica, is tough, dimensionally recuperative and not brittle, nor will it peel or "flake" off.

The combination of the novel generator configuration with the novel pellet charge develops a powerful impulse the amplitude and duration of which may be varied to suit various types of airfoils and in any event produces a sinusoidal force-time curve of impulse that matches the natural frequency of the particular airfoil, without, however, admixture of other modes of vibration. As a consequence, the damping characteristics can readily be ascertained from the enlarged but accurate "curves" indicated on the oscilloscope on the ground.

The invention enables the analytic derivation of the geometry of a pellet and of the nozzle area inasmuch as it incorporates controllable variables.

Thus, for one thing, this invention supersedes the cumbrous weighty prior generators and replaces the old low-density, too quick-burning pellets by combining any suitable explosive powder-granule with means that convert the granule into a high-density, high-potential, slow-burning pellet producing combustion products of low specific heat. Thereby the ordinary, unsatisfactory admixture of time-force curves are reduced to a single sinusoidal curve the length of which equals ½ the natural period of the airfoil. The significantly high differential between the igniter temperature and the exhaust temperature is achievable by controlling the thickness and geometry of the coating without altering the explosive's composition.

In order to render these, and other, inventive concepts more concrete, the presently-preferred embodiments of the inventive concepts are representionally shown in the accompanying drawings and described hereinafter in conjunction therewith. It is to be understood, however, that these drawings and this description are presented for purposes of exemplification only and in no wise limit the scope of the invention except insofar as required by the ambit of the sub-joined claims.

In these drawings:

FIGURE 1 is a chordwise sectional view of a stabilizer-elevator group, indicating one of the present generators and its associated functionalities;

FIGURE 2 is a detailed view of the now-preferred form of the loaded generator the view being partly in longitudinal central section and partly in side elevation;

FIGURE 3 is a left-end view thereof;

FIGURE 4 is a longitudinal sectional view of a nozzle of a different type from that of FIGURE 2;

FIGURE 5 is a longitudinal central view of the propellant cartridge with which the generator is charged;

FIGURE 6 is a side view of one of the novel pellets;

FIGURE 7 is a representation of an oscillograph record of the action of various airplane flight-surfaces when excited by one or more of the present generators and propellants; and FIG. 8 is a view, partly in chordwise section and partly in elevation, of the impulse generator so mounted in an airfoil as to effectuate vertical vibration or flexure of the airfoil.

The presently-preferred embodiment 12 of the impulse generator is indicated in FIGURE 1 in use for flight-testing the damping characteristics of the stabilizer of a stabilizer-elevator group 16. Unit 12 is mounted in upright attitude, by means of brackets 13, to a spar 14 of the stabilizer with its discharge orifice, or nozzle, A, projecting thru an opening, not shown, in the stabilizer tip, also not shown. The conductors 15 of a firing circuit, for effecting combustion of one charge and causing the stabilizer to vibrate through at least 12 cycles, are connected to the upper end of the generator and terminate near the pilot's station.

The sinusoidal vibration wave trains of the airfoil are received by an accelerometer 17 which, by means of a "beacon," not shown, transmits same to an oscillograph, not shown, of a ground monitoring station. This beacon is connected to the accelerometer by means of a conductor path 18.

The novel impulse generator, loaded, is shown in FIGURE 2 as comprising a body 19 of generally hollow cylindric conformation and including a breech-group 20 at one end which is opposed by a firing group C at the other end. A nozzle group, 23, opens laterally into the breech and may assume manifold forms, two forms being shown in the present drawings. The barrel terminates at each of its opposite ends in the form of a square flange, 19A, as shown in FIGURE 3, each flange including four bolt holes for bolting the gun to supporting structure, as shown.

An elongate cylindric cartridge, B, is disposed coaxially of the body 19 between the firing group and the breech, being inserted, of course, after removal of the firing group from the threaded open end of the body.

As shown in FIGURE 5, the cartridge comprises an open-ended cylindric casing bearing an external annular flange 31 at one end and an inturned resilient flange 50 at the opposite end. Inwardly of the left end, as seen in FIGURE 5, lies an igniter-cup 25, disposed coaxially of the casing and consisting of a concave disk 21 of some such suitable explosive as U.S. Navy No. 553455 powder held by varnish to a conforming concave disk 26 of nitrocellulose. Near the right-hand open end of the cartridge a concave disk 27 of nitrocellulose, similar to disk 26 is mounted coaxially in the casing.

Intermediate disks 26 and 27 a propellant charge 29 is provided and this charge consists of a number of cylindric pellets of modified smokeless powder, the pellets usually numbering 96 in total count.

The flange 31 is adapted to seat in the corresponding groove shown in the casing so as to anchor the left-hand end, the opposite end of the casing including the inturned resilient flange for guiding, seating, and resiliently seizing the casing on an abutment 28. This abutment is perforated, as shown at 30 and 32, to enable the combustion products to freely pass to the nozzle despite the presence of this guiding and seating structure.

The propellant consists of a plurality of pellets 39 each having the form of a centrally perforate cylindric solid of revolution as seen in FIGURE 6. They are composed of a conventional smokeless powder, such as that employed in U.S. Navy MK. I, Mod. 2 bomb ejector cartridges, suitably modified as described hereinafter. Each pellet is coated on its outer cylindric surface and on each of its two ends with a combustion inhibitor.

The combustion inhibitor essentially consists of silica, preferably in "expanded" condition, such as Cabosil, and a binder, preferably a phenol formaldehyde spar type varnish such as the V-481 varnish made and distributed by Fuller Paint and Varnish Company. The latter is an emulsion of Bakelite, China-wood oil and ketone solvent.

The inhibitor is prepared by mixing the varnish with the Cabosil until 5% by weight of Cabosil has been added. To every 50 grams of the varnish and silica mixture 3 drops of cobalt naphthenate are added. To this mixture is added 10% by volume of toluene the whole being blended so as to obviate lumps. When applied to the aforesaid smokeless powder, this mixture, since it includes toluene and cobalt naphthenate, incorporates a suitable catalytic effect on the coating-ingredients, causing them to polymerize and harden even on the explosive powder, as is well known, since the preferred smokeless powder is a single base derivative of guncotton plus graphite.

The coating 40 is applied by "dipping," at a thickness that varies from 0.005 inch to 0.010 inch, depending upon the specific composition of the smokeless powder employed and the kind of igniter utilized. The "dipping" method of coating is well adapted to meet the requirements as to variations in thickness of coating.

The means and arrangements for initiating combustion of the propellant charge are detailed in FIGURES 2 and 5 and are all conventional in this art. This portion of the device includes an electrical energizing group, C and a detonator group, 59. Group C is a unitary firing cap assembly that includes a conductive metallic shell 34 constituting the negative, or return path, for the firing current. Coaxially mounted in this shell is an insulator shell 33 and mounted coaxially in shell 33 is a metallic plug 36 which constitutes the input path for the firing current and terminates inwardly in a firing point.

The parts 33, 34, and 36 are held in place by a retainer ring 37. Shell 34 bears, on the exterior of its outer end a plurality of terminals 38 for the electrical lead-out wires to the energy source. The conductor path 15 leads to the input plug 36.

The proximal end of the cartridge contains the detonator group 59, and, being substantially conventional, comprises a filler and spacer annulus 60, the longitudinal central portion of which is occupied by a metallic, or brass, conductor 62, surrounded by an insulator sleeve 61. The point of lead-in plug 36 contacts the outer end of conductor 62. A brass sleeve 70 with a concave inner end 71 surrounds the inner end of conductor 62 and the concavity 63 in sleeve 70 is filled with a fulminate such as lead styphenate. The fulminate is fired by means of filaments 65 radiating thereinto from 62. The lead styphenate is not electrically conductive and the current passes through the filaments to the metallic sleeve 70 and thence to a ground.

Detonation of the lead styphenate fires the powder disk 21 and the nitrocellulose 26 and hence sets the combustion of the propellant pellets "in train."

The geometry of the nozzle orifice can be varied to be compatible with the various effects achieved by varying the composition of the smokeless powder and the igniter, and to be commensurate with the cartridges of various sizes as indicated in FIGURES 2 and 4. Its critical cross-sectional area can be determined by means of an analytic solution of the general internal ballistics problem of the generator, as set forth hereinafter. This solution is predicated upon the fact that one of the concepts of the invention is to take advantage of the discharge of the combustion products at a considerably lower temperature than that of the igniter, providing a thermal energy differential which is converted to thrust.

The area of the throat of the nozzle in square inches can be derived from the following formula:

$$A_T = \frac{\text{Total thrust in pounds}}{\frac{P_T(K+1)}{\left(1+\frac{K-1}{2}\right)^{\frac{K}{K-1}}} - P_0}$$

in view of the fact that the relationships of the various variables become discontinuous as the propellant web thickness reaches zero.

Other variables bear the following relationships:

$$\frac{dW_B}{dt} = \frac{CA_T P_T \sqrt{\frac{2g}{RT_C} \cdot \frac{K}{K-1}\left(\frac{P_C}{P_T}\right)^{\frac{K-1}{K}}\left[\left(\frac{P_C}{P_T}\right)^{\frac{K-1}{K}} - 1\right]}}{\sqrt{1-\left(\frac{A_T}{A_C}\right)^2\left(\frac{P_T}{P_C}\right)^{\frac{2}{K}}}}$$

which formula obtains at subsonic velocities and in which:

$A_B$ = burning surface area, in.$^2$
$W_D$ = weight discharged, lbs.
$g$ = gravitational acceleration, in./sec.$^2$ = 386.0
$C_P$ = constant pressure specific heat, gases = 0.401
$C_V$ = constant volume specific heat, gases = 0.313
$W_B$ = weight of propellant burned, lbs.;
$t$ = time increment; seconds
$V_B$ = volume of propellant burned, cu. in.;
$C$ = discharge coefficient;
$\mu$ = specific co-volume of propellant, cu. in.;
$A_T$ = nozzle throat area, sq. in.;
$V_P$ = unburned propellant volume, cu. in.;
$P_T$ = unburned propellant pressure, lbs./sq. in.
$R$ = gas's constant, 816 = in./° Rankin;
$t$ = time in seconds.
$T_C$ = combustion chamber temp., ° R.;

$K = \dfrac{\text{constant pressure specific heat, gases} = .401}{\text{constant volume specific heat, gases} = .313}$;

$P_C$ = combustion chamber pressure, #/in.$^2$
$q$ = heat of combustion, B.t.u./lb.
$A_C$ = combustion chamber area, sq. in.;
$R$ = gas constant in./° Rankin.

At supersonic velocities, the weight of gases discharged, $W_D$, is the principal consideration and is obtained from the following formula:

$$\frac{dW_D}{dt} = A_T P_C \sqrt{\frac{gK}{RT_C}\left(\frac{2}{K+1}\right)^{\frac{K+1}{K-1}}}$$

Considering the sub-sonic operation of the nozzle, as in FIGURE 4, and employing high temperature gas constants, after the second derivative is obtained, then:

$$P_T = P_C\left(\frac{2}{K+1}\right)^{\frac{K}{K-1}}$$

$$= P_C\left(\frac{2}{2.28}\right)^{\frac{1.28}{.28}}$$

$$= .549 P_C;$$

and $$\frac{dW_D}{dt} = \frac{CA_T}{\sqrt{T_C}} \cdot (.549 P_C)$$

$$\cdot \frac{\sqrt{\frac{2\times 386}{816}\times\frac{1.28}{.28}\left(\frac{P_C}{P_T}\right)^{\frac{.28}{1.28}}\left[\left(\frac{P_C}{P_T}\right)^{\frac{.28}{1.28}} - 1\right]}}{\sqrt{1-\left(\frac{A_T}{A_C}\right)^2\left(\frac{P_T}{P_C}\right)^{2/1.28}}}$$

However, if the approach velocity of the gases before they enter the nozzle is to be of a negligible value, $A_T/A_C$ must be substantially equal to zero, so that:

$$\frac{dW_D}{dt}$$

$$= \frac{.549 CA_T P_C}{\sqrt{T_C}} \cdot \frac{\sqrt{4.32\left(\frac{P_C}{.549 P_C}\right)^{.2185}\left[\left(\frac{P_C}{.549 P_C}\right)^{.2185} - 1\right]}}{\sqrt{1}}$$

So that $$\frac{dW_D}{dt} = \frac{.549 CA_T P_C}{\sqrt{T_C}}\sqrt{4.52\times 1.14(1.14-1)} = \frac{.454 CA_T P_C}{\sqrt{T_C}}$$

In order to approximately equalize high subsonic velocities and low supersonic velocities, an "underexpanding," or even restrictive, type of nozzle may be employed as in FIGURE 2 and the gas-discharge coefficient C may be taken as unity, then for $W_D$ the high and low velocity expressions are equal, so that the simpler formula may be used:

$$\frac{dW_D}{dt} = A_T P_C\sqrt{\frac{386\times 1.28}{816\times T_C}\left(\frac{2}{2.28}\right)^{2.28/.28}}$$

$$= \frac{A_T P_C}{\sqrt{T_C}}(.454).$$

Preferably, a smokeless powder, such as JAN-P-231 is employed and it is known that its burning rate is:

$$\frac{dy}{dt} = .0002 P_C + .12;$$

Integrating:

$$y = \int_0^t (.0002 P_C + .12)\,dt \qquad (1)$$

$V_B$ = volume of propellant burned $$= A_B\int_0^t y\,dt = \int_0^t (.0002 P_C + .12) A_B\,dt \qquad (2)$$

where $$A_B = A_{B_0} + f(y)$$

$$W_B = .057\int_0^t (.0002 P_C + .12) A_B\,dt \qquad (3)$$

$$P_C = \frac{RT_C}{\dfrac{V_C - V_{P_0} - V_B}{W_B - W_D} - \mu}\cdot\frac{\text{lbs.}}{\text{in.}^2} \qquad (4)$$

$$T_C = T_0 + q/C_V = 530 + 1500/.313 \qquad (5)$$

where $q$ = heat of combustion, B.t.u./lb.
  = 5300° Rankin

In order to obtain expressions defining the pellet geometry, simultaneous Equations 1–5, inclusive, can be successively solved for the five unknowns. For, they give a solution to the equation that describes the burning-surface area of a pellet in terms of $y$ (= distance burned in inches), and in terms of $P_C$.

This last equation is:

$$f(y) = A_B - A_{B_0}$$

where $A_B$ = burning surface area, sq./in.
$A_{B_0}$ = initial burning surface area, in.$^2$.

The aforedescribed nozzle functions, operated upon with this equation, and equated to the empirically derived equation of whatever force-time curve may be needed in the circumstances, give the final equation of the pellet geometry:

$$P_T = P_C \left(\frac{2}{K+1}\right)^{\frac{K}{K-1}}$$

and $$\text{Thrust} = \frac{P_T A_T (K+1)}{\left(1 + \frac{K-1}{2}\right)^{\frac{K-1}{K}}} P_0 A_R$$

$P_0$ being atmospheric pressure.

Both nozzles, shown in FIGURES 2 and 4 are substantially of the conventional, axially-expanding or under-expanding but restrictive type, each one comprising a neck portion 44 for screwing into the breech portion of the "gun," a constant diameter bore 47, and an outlet 48, the one in FIGURE 4 being radially enlarged and concaved to augment the thrust. Both start emitting at sub-sonic velocity, rise to super-sonic and diminish to sub-sonic.

The geometry of the pellet can also be generalized, to a certain extent, by means of the following relationship of the burning surface area, $A_B$, to the actual distance burned, $y$:

$$A_B = 9.42 + 151.0Y$$

A plurality of these devices can be mounted generally together on an airfoil, electrically in connection with a firing switch at the pilot's station and fired in sequence to telemeter a number of readings from the same airfoil. Each is so small and light as to free the total from distorting the dynamic characteristics of the airfoil.

In FIGURE 7 the oscillograph traces of the vibration flight-testing of a number of flight-surfaces are more or less representationally shown. The showing indicates the minor vibratory condition of these surfaces before firing the impulse generator at the leftward end portion of each trace, the generator being fired at a juncture indicated by the point 42. As shown, the amplitude of vibration is greatest at this point, the remainder of each curve attenuating toward the right, indicating that each of the flight-surfaces possesses the desired inherent positive damping characteristic. It will also be observed that each curve is more or less sinusoidal in shape.

In each of these curves, the ordinatewise differential in height between one antinode of the sinusoidal curve and the next succeeding antinode can be visually or mechanically picked off and plotted in a conventional force-time curve, not shown. From the latter, of course, one can instantly perceive whether there is positive, neutral, or negative damping.

In FIGURE 8, the impulse generator is shown mounted in a super-sonic airfoil so as to cause upward and downward flexure thereof, the nozzle protruding upwardly through the airfoil and discharging upwardly. An accelerometer 17 and a firing system 15, substantially identical to those shown heretofore, are employed, as and for the purposes described. The subsequential features are the same as those previously described.

Although certain parameters and certain specific compositions, shapes, etc. have been mentioned in the foregoing description, such specificity in no wise constitutes the invention or limits same except insofar as required by the scope of the sub-joined claims.

I claim:

1. A method of making a solid propellant pellet in the form of a right cylinder having a single axially extending perforation therethrough and having an inhibitor coating only on the cylindrical pellet's cylindric external surface and on the cylindrical pellet's two opposite annular end-faces, the cylindric internal surface being bare, comprising: making a varnish by mixing an emulsion of Bakelite, China-wood oil and a ketone while adding silica thereto as 5% of the total volume; adding to each 50 grams of said varnish, three drops of cobalt naphthenate; adding toluene as 10% of the volume of the aforesaid mixture; blending the final mixture; taking a guncotton pellet in the form of a right cylinder having a single, axial perforation therethrough; forming from the aforesaid mixture, a coating only on the pellet's cylindric external surface and annular end surfaces; and enabling the resultant coating to dry and set as an abrasion-resistant, ignition-flame puncture-inhibiting jacket on all the surfaces of said pellet except the internal cylindric surface defined by said perforation.

2. A method of making a solid propellant pellet in the form of a right cylinder having a single axially extending perforation therethrough and having an inhibitor coating only on the cylindrical pellet's cylindric external surface and on the cylindrical pellet's two opposite annular end-faces, comprising: making a varnish by mixing an emulsion of Bakelite, China-wood oil and a ketone while adding silica thereto as 5% of the total volume; adding to each 50 grams of the varnish, three drops of cobalt naphthenate; adding toluene as 10% of the volume of the aforesaid mixture; blending the final mixture; taking a guncotton pellet in the form of a right cylinder having a single, axial perforation therethrough; and forming from the aforesaid mixture, a coating, variable in thickness from .005 in. to .010 in. only on the pellet's cylindric side surface and annular end surfaces.

3. A solid-propellant pellet, comprising: a right-cylindric piece of nitrocellulose having a single constant diameter axial perforation, said piece having a diameter approximating its length, the hollow nitrocellulose piece having a wall-thickness, because of the diameter of said constant thickness axial perforation, less than the diameter of the hollow; and a jacket for the exterior surface of the body of the cylinder and for the end-faces thereof, said jacket being abrasion resistant and flame-puncture proof and having a modulus of elasticity rendering it dimensionally stable; said jacket consisting of the product of the reaction of phenol-formaldehyde varnish, cobalt naphthenate and toluene and also including silica.

4. A solid propellant pellet, comprising: a short hollow thick-walled cylinder composed mainly of nitrocellulose, the internal wall of said hollow cylinder being of uniform diameter; said internal wall being bare pure nitrocellulose, said pellet having an external cylindric surface and annulus-like end surfaces, both said surfaces bearing a coating consisting primarily of a varnish, each 50 grams of which varnish also includes three drops of cobalt naphthenate, these two components constituting a mixture, and said coating also including toluene in the amount of 10% of the mixture of varnish and naphthenate, the resultant end-product of the chemical reaction of the varnish, cobalt naphthenate, and toluene constituting a dry, cold-set, ignition-flame puncture-proof and abrasion-resistant jacket for all of the pellet except the wall of said hollow.

(References on following page)

References Cited in the file of this patent

UNITED STATES PATENTS

| | | |
|---|---|---|
| 930,979 | Maxim | Aug. 10, 1909 |
| 1,074,809 | Newton | Oct. 7, 1913 |
| 2,284,640 | Coffman | June 2, 1942 |
| 2,367,012 | De Guerin | Jan. 9, 1945 |
| 2,466,561 | Standal | Apr. 5, 1949 |
| 2,529,791 | Whitworth et al. | Nov. 14, 1950 |
| 2,643,184 | Cairns | June 23, 1953 |
| 2,706,382 | Logan et al. | Apr. 19, 1955 |
| 2,712,283 | Golden | July 5, 1955 |
| 2,811,015 | Vegren | Oct. 29, 1957 |
| 2,877,709 | Duckworth | Mar. 17, 1959 |

FOREIGN PATENTS

| | | |
|---|---|---|
| 679,157 | Great Britain | Sept. 10, 1952 |

OTHER REFERENCES

Chemical Engineering Magazine; vol. 53, No. 12, page 96 required. December 1946.

Reprint from Jet Propulsion magazine, February 1956, page 103 relied upon. Copy in Library and Division 10.